(12) United States Patent
Al et al.

(10) Patent No.: US 12,024,032 B2
(45) Date of Patent: Jul. 2, 2024

(54) ENERGY MONITORING SYSTEM FOR DISCHARGING ENERGY IN AN ENERGY TRANSFER DEVICE OF A VEHICLE

(71) Applicant: Volvo Car Corporation, Gothenburg (SE)

(72) Inventors: Fatih Al, Gothenburg (SE); David Martin Gonzalez, Gothenburg (SE); Ignacio Garcia Bajo, Gothenburg (SE); Tobias Caesar, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 103 days.

(21) Appl. No.: 17/858,483

(22) Filed: Jul. 6, 2022

(65) Prior Publication Data

US 2023/0009256 A1  Jan. 12, 2023

(30) Foreign Application Priority Data

Jul. 9, 2021 (EP) .................................. 21184893

(51) Int. Cl.
*B60L 3/00* (2019.01)
*B60L 1/00* (2006.01)
*H02J 7/00* (2006.01)
*H02J 7/34* (2006.01)

(52) U.S. Cl.
CPC ............. *B60L 3/0046* (2013.01); *B60L 1/00* (2013.01); *H02J 7/0047* (2013.01); *H02J 7/345* (2013.01)

(58) Field of Classification Search
CPC ........ B60L 3/0046; B60L 1/00; H02J 7/0047; H02J 7/345
See application file for complete search history.

(56) References Cited

U.S. PATENT DOCUMENTS

2018/0026468 A1* 1/2018 Lee ........................... H02J 7/02
                                                                320/107
2019/0041938 A1* 2/2019 Zupanc ..................... G06F 1/30

FOREIGN PATENT DOCUMENTS

EP       3640076 A1 * 4/2020 ............ B60L 3/0007
EP       3640076 B1    3/2021
JP    2009240016 A    10/2009

OTHER PUBLICATIONS

Dec. 17, 2021 European Search Report issued in International Application No. 21184893.

* cited by examiner

*Primary Examiner* — Jared Fureman
*Assistant Examiner* — Duc M Pham
(74) *Attorney, Agent, or Firm* — Clements Bernard Walker; Christopher L. Bernard

(57) ABSTRACT

An energy monitoring system for discharging energy in an energy transfer device of a vehicle, including an isolation monitoring unit, a capacitor unit, a voltage terminal unit and a control unit. The voltage terminal unit is connectable to an energy storage system and transfers energy from the energy storage system to a vehicle subsystem. The isolation monitoring unit includes a first isolation resistor element and switch element. The resistor element is connectable to the voltage terminal unit via the switch element. The capacitor unit is connected to the voltage terminal unit and filters electromagnetic interference by storing energy during energy transfer to the subsystem. The control unit closes the first isolation switch element in case of a disconnection of the energy transfer to form a discharge circuit connecting the isolation monitoring unit and the capacitor unit. The discharge circuit discharges energy stored in the capacitor unit.

15 Claims, 2 Drawing Sheets

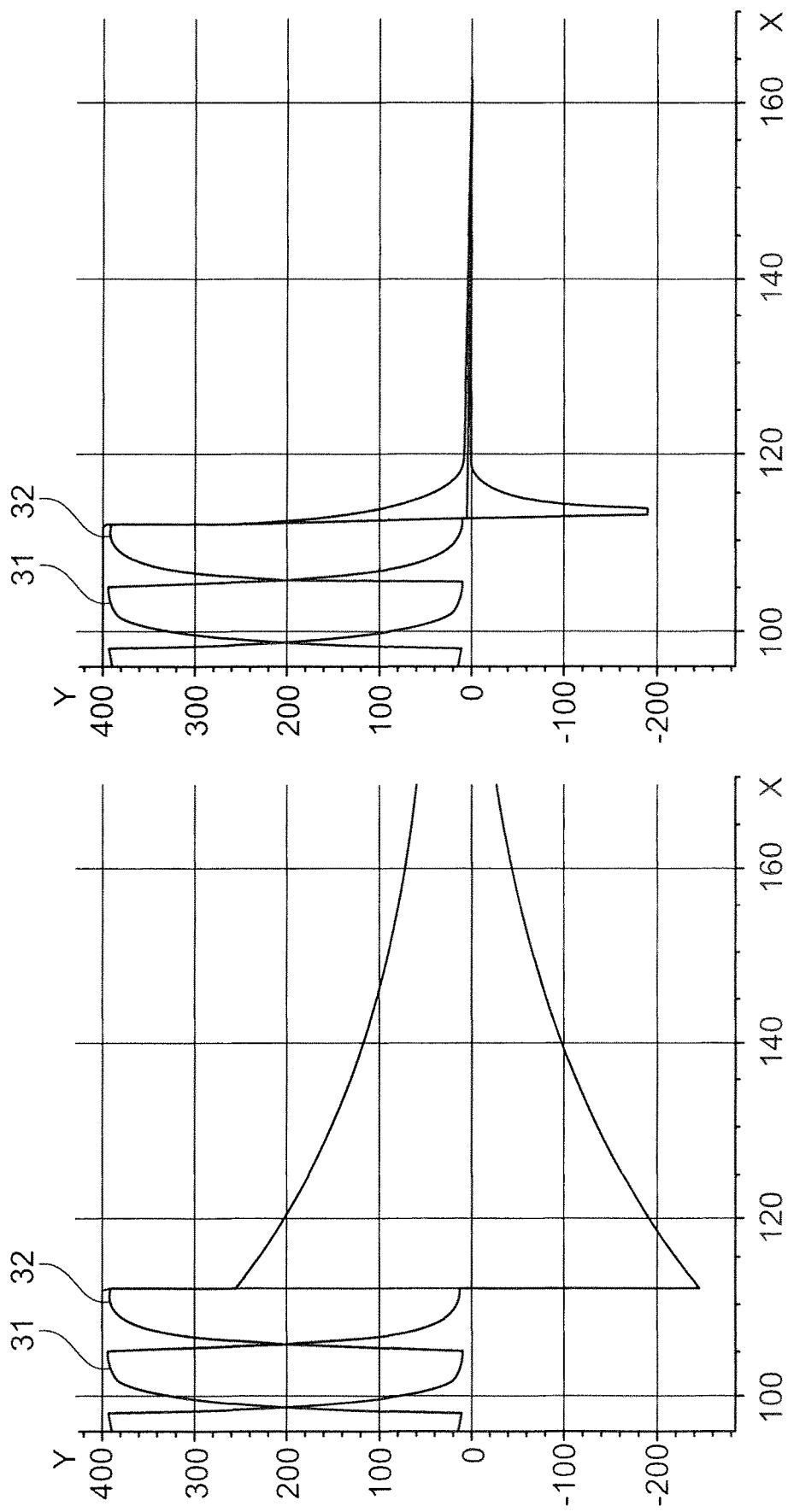

ENERGY MONITORING SYSTEM FOR DISCHARGING ENERGY IN AN ENERGY TRANSFER DEVICE OF A VEHICLE

CROSS-REFERENCE TO RELATED APPLICATION

The present disclosure claims the benefit of priority of co-pending European Patent Application No. 21 184 893.2, filed on Jul. 9, 2021, and entitled "An Energy Monitoring System for Discharging Energy in an Energy Transfer Device of a Vehicle," the contents of which are incorporated in full by reference herein.

TECHNICAL FIELD

The present disclosure relates to an energy monitoring system for discharging energy in an energy transfer device of a vehicle, an energy transfer device including such an energy monitoring system, a vehicle including such an energy transfer device, an energy discharging method for an energy transfer device and a computer program element for discharging energy.

BACKGROUND

An electric vehicle such as battery electric vehicle or hybrid electric vehicle may be powered by a high voltage energy storage system. In general, the energy storage system is connected to at least one capacitor arranged between high voltage terminals and an electrical chassis. A primary purpose of Y-capacitors is to assure better electromagnetic compatibilities in a high voltage system. The Y-capacitors may have a large capacitance to remove high frequency noise generated from at least one load.

After a disconnection of energy transfer from the high voltage energy storage system, however, electrification may still remain in the Y-capacitors. Such Y-capacitors are generally discharged by at least one active resistor. However, due to high isolation resistance in the high voltage energy storage system, a duration of discharging the Y-capacitors may be elongated.

SUMMARY

Hence, there may be a need to provide an improved energy monitoring system which may rapidly discharge a capacitor unit if a power supply from an energy storage system is disconnected.

The problem is solved by the subject matter of the present disclosure. It should be noted that the aspects of the disclosure described in the following apply to the energy monitoring system for discharging energy in an energy transfer device of a vehicle, the energy transfer device including such an energy monitoring system, the vehicle including such an energy transfer device, the energy discharging method for an energy transfer device and the computer program element for discharging energy.

According to the present disclosure, an energy monitoring system is presented. The energy monitoring system is configured for discharging energy in an energy transfer device of a vehicle. The energy monitoring system includes an isolation monitoring unit, a capacitor unit, a voltage terminal unit and a control unit. The voltage terminal unit is connectable to an energy storage system and configured to transfer energy from the energy storage system to at least one subsystem of the vehicle. The isolation monitoring unit includes a first isolation resistor element and a first isolation switch element. The first isolation resistor element is connectable to the voltage terminal unit via the first isolation switch element. The capacitor unit is connected to the voltage terminal unit and configured to filter electromagnetic interferences by storing energy during energy transfer from the energy storage system to the subsystem. The control unit is configured to close the first isolation switch element in case of a disconnection of the energy transfer to form a discharge circuit connecting the isolation monitoring unit and the capacitor unit. The discharge circuit is configured to discharge energy stored in the capacitor unit.

The energy monitoring system according to the present disclosure allows a quick discharge of the capacitor unit within a few seconds by applying existing components without incorporating any additional resistor to the capacitor unit after the disconnection of the energy transfer. Generally, the isolation monitoring unit is switched off in case of the disconnection of the energy transfer and the capacitor unit may be discharged by an additional active resistor. However, by providing a switchable discharge circuit, which at least partially includes the isolation monitoring unit and one or more resistor elements arranged in the energy transfer device, no additional costs and components are required.

The energy transfer device may be coupled to the energy storage system such as a battery system to supply power to the vehicle. The energy transfer device may be configured to transfer electric energy to at least one, preferably several subsystems of the vehicle, to propel the vehicle. The subsystems may be, for instance, an electric front axle drive system or an electric rear axle drive system. The voltage terminal unit may be an interface between the energy storage system and the energy transfer device to reliably transfer the electric energy.

The isolation monitoring unit may be electrically connected to the energy storage system via the voltage terminal unit and configured to monitor an isolation state of the energy storage system from a chassis of the vehicle. In other words, the isolation monitoring unit may measure an isolation resistance of the energy storage system by closing the first isolation switch, thus electrically connecting the first isolation resistor element to the voltage terminal unit when it is connected to the energy storage system. The isolation monitoring unit may include a high resistance of approximately 400 kΩ, wherein the isolation resistance may depend on a voltage supplied from the energy storage system.

The capacitor unit may include at least one capacitor element and filter electromagnetic interferences by storing energy during the energy transfer from the energy storage system to the subsystems of the vehicle. The capacitor unit may be, hence, configured for absorbing a high frequency noise of the energy transfer device, balancing fluctuating instantaneous power and/or stabilizing ripple current/voltage during the energy transfer to assure electromagnetic compatibilities of the energy transfer device and/or the energy storage system.

However, even though the energy storage system is electrically disconnected from the voltage terminal unit and/or the energy transfer device ordinarily or accidently, the capacitor unit may still contain electric energy. In such a case, to reliably discharge the electric energy stored in the capacitor unit, the control unit may establish the discharge circuit between components.

The control unit may be in communication with at least one electronic control unit of the vehicle. The control unit may be configured to receive information about an energy transfer state from the energy storage system to the subsystems and an energy level of the capacitor unit. For instance, after the disconnection of the energy transfer, the control unit may determine if the energy level of the capacitor unit exceeds a predefined threshold. The predefined threshold may be a safe energy level of the capacitor unit. Hence, if the detected energy level of the capacitor unit is higher than the predefined threshold, the control unit may initiate to discharge the capacitor unit to reduce or even remove energy stored in the capacitor unit by means of the discharge circuit.

In the discharge circuit, the isolation monitoring unit and the capacitor unit may be connected. In particular, the first resistor element may be coupled with the capacitor unit by closing the first isolation switch element of the isolation monitoring unit. Preferably, the first switch element is the only switch element of the isolation monitoring unit, which is closed in case of the disconnection of the energy transfer from the energy storage system. Accordingly, energy stored in the capacitor unit may be quickly discharged by the first resistor element without energizing the voltage terminal unit.

In an example, the discharge circuit is switchable only in case of the disconnection of the energy transfer. In other words, the discharge circuit including at least partially the isolation monitoring unit may be formed only when the energy transfer from the energy storage system to the subsystems is stopped.

In an example, the isolation monitoring unit includes a second isolation switch element and a second isolation resistor element. The second isolation resistor element is connectable to the voltage terminal unit via the second isolation switch element. The control unit is configured to open the second isolation switch element in case of the disconnection of the energy transfer.

The first isolation resistor element and the first isolation switch element may be arranged in series and the second isolation resistor element and the second resistor element and the first isolation switch element may be arranged in series. However, the first isolation resistor element and the second isolation resistor element may be arranged in parallel such that the first isolation resistor element and the second isolation resistor element may be connected to the voltage terminal unit at different poles. Accordingly, to allow a monitoring of the isolation resistance of the energy storage system, both of the first isolation switch element and the second isolation switch element may be closed.

However, in case of the disconnection of the energy transfer from the energy storage system, it is not required anymore to monitor the isolation resistance of the energy storage system. Accordingly, both of the first isolation switch element and the second isolation switch element may be closed. However, despite the disconnection of the energy transfer, the first isolation switch element may remain closed to couple the first isolation resistor element with the voltage terminal unit. Accordingly, the isolation monitoring unit may not be able to monitor the isolation resistance of the energy storage system but the first isolation resistor element of the isolation monitoring unit may be connected to the capacitor unit to form the discharge circuit for discharging energy stored in the capacitor unit. Alternatively, the first isolation switch element may be opened and the second isolation may be closed to couple the second isolation resistor element with the voltage terminal unit.

In an example, the voltage terminal unit includes a positive terminal element and a negative terminal element. The first isolation switch element is arranged between the first isolation resistor element of the isolation monitoring unit and the negative terminal element of the voltage terminal unit. The second isolation switch element is arranged between the second isolation resistor element of the isolation monitoring unit and the positive terminal element of the voltage terminal unit. Alternatively, the second isolation switch element may be arranged between the second isolation resistor element and the negative terminal element of the voltage terminal unit, and the first isolation switch element may be arranged between the first isolation resistor element and the positive terminal element of the voltage terminal unit.

In an example, the energy monitoring system further includes at least one main contactor element. The main contactor element is arrangeable between the voltage terminal unit and the subsystem. The control unit is configured to open the main contactor element in case of the disconnection of the energy transfer. The main contactor element may include at least one main switch element, which is configured to connect the subsystem to the energy storage system to supply energy or to disconnect the subsystem from the energy storage system to stop the energy transfer. Accordingly, the main contactor element may be opened to disconnect the energy supply from the energy storage system to the subsystems.

In an example, the energy monitoring system further includes a diagnostic monitoring unit with at least one diagnostic resistor element for monitoring at least one electrical connection during the energy transfer. The discharge circuit connects the isolation monitoring unit, the diagnostic monitoring unit and the capacitor unit for discharging energy stored in the capacitor unit.

The diagnostic monitoring unit may include preferably several diagnostic resistor element arranged between the negative terminal element of the voltage terminal unit and components such as contactors and/or fuses. For instance, each diagnostic resistor element may be configured to provide a resistance of approximately 500 kΩ. The control unit may be connected to the diagnostic monitoring unit and configured to receive information about electromechanical connections inside the energy monitoring system and/or the energy transfer device, particularly in case of a malfunction or a failure of the components such as defect of welded contactors or blown fuses.

However, if the main contactor element is opened and the energy transfer from the energy storage system is disconnected, the diagnostic monitoring unit may be directly connected to the first isolation resistor element and the capacitor unit to form the discharge circuit. A resistance capacity of the energy monitoring system may be, thus, increased by the diagnostic resistor element(s) and the first isolation resistor element. Accordingly, latent energy stored in the capacitor unit may be easily and quickly transferred to the diagnostic resistor element(s) and the first isolation resistor element after the disconnection from the energy transfer.

In an example, the capacitor unit includes at least one Y-capacitor element. The Y-capacitor element may be connected between the energy storage system via the voltage terminal unit and the chassis of the vehicle and configured to filter out a high frequency noise to provide better electromagnetic compatibilities. Further, the Y-capacitor element may be configured to balance fluctuating instantaneous power and/or stabilize ripple current/voltage during the energy transfer. The Y-capacitor element may include a ceramic materials. For instance, each Y-capacitor element may include capacity of 2 µF.

In an example, the voltage terminal unit is a high voltage terminal unit connectable to a high voltage energy storage system. The energy storage system arranged in a vehicle may be able to supply high voltage energy to propel the vehicle. Accordingly, the voltage terminal unit may be configured to reliably transfer high voltage energy to the subsystems of the vehicle.

In an example, the energy monitoring system is configured to discharge the capacitor unit less than 5 seconds. Since the discharge circuit may utilize the first isolation resistor element and one or more diagnostic resistor elements, as soon as the main contractor is disconnected from the energy storage system, the latent energy stored in the capacitor unit may be within a few minutes quickly discharged.

According to the present disclosure, an energy transfer device is presented. The energy transfer device includes the energy monitoring system as described above. The energy transfer device may further include additional switch elements, additional capacitor units and/or a high voltage bus unit arranged between the energy storage system and the subsystems of the vehicle to transfer energy. The energy transfer device may be monitored by the energy monitoring system and configured to discharge energy stored in the capacitor unit in case of the disconnection of the energy transfer.

According to the present disclosure, a vehicle is presented. The vehicle includes an energy storage system and the energy transfer device as described above. The energy transfer device is arranged between the energy storage system and an electrical chassis of the vehicle.

In an example, the vehicle is a battery electric vehicle or a hybrid electric vehicle. The battery electric vehicle or the hybrid electric vehicle, which may utilize a high voltage energy storage system providing traction energy for propulsion.

In an example, a control unit is configured to form a discharge circuit if energy transfer from the energy storage system to at least one subsystem of the vehicle being disconnected. The capacitor unit may be arranged between the energy storage system and the electrical chassis of the vehicle and configured to stabilize the energy transfer and from the energy storage system to the subsystems of the vehicle. However, if the energy transfer is disconnected, the capacitor unit charged with electric energy may be required to be discharged to avoid any electric shock via the electrical chassis of the vehicle. Hence, the control unit may monitor the energy transfer from the energy storage system to the subsystems and switch the isolation monitoring unit and/or the diagnostic monitoring to the discharge circuit to discharge the latent energy stored in the capacitor unit if the energy transfer is disconnected. Accordingly, the capacitor unit may be quickly and safely discharged.

According to the present disclosure, an energy discharging method for an energy transfer device of a vehicle is presented. The energy discharging method includes:
  connecting a capacitor unit to a voltage terminal unit,
  transferring energy from an energy storage system to at least one subsystem of the vehicle,
  closing a first isolation switch element of an isolation monitoring unit in case of a disconnection of energy transfer to form a discharge circuit connecting the isolation monitoring unit and the capacitor unit, and
  discharging energy stored in the capacitor unit.

The capacitor unit is configured to filter electromagnetic interferences by storing energy during energy transfer from the energy storage system to the subsystem. The voltage terminal unit is connectable to an energy storage system. A first isolation resistor element of the isolation monitoring unit is connectable to the voltage terminal unit via the first isolation switch element.

The energy discharging method may further include opening a second isolation switch element of the isolation monitoring unit and main contactor element in case of a disconnection of energy transfer and/or connecting the diagnostic monitoring unit to the discharge circuit.

According to the present disclosure, a computer program element is presented. The computer program element is configured for an energy monitoring system as described above. The program element is adapted to perform the method steps as described above, when being executed by a processing element.

It should be noted that the above embodiments may be combined with each other irrespective of the aspect involved. Accordingly, the method may be combined with structural features and, likewise, the system may be combined with features described above with regard to the method.

These and other aspects of the present embodiments will become apparent from and elucidated with reference to the embodiments described hereinafter.

BRIEF DESCRIPTION OF THE DRAWINGS

Exemplary embodiments will be described in the following with reference to the following drawings:

FIG. 2 shows schematically and exemplarily a diagram of discharging a capacitor unit by a conventional energy monitoring system.

FIG. 3 shows schematically and exemplarily a diagram of discharging a capacitor unit by an energy monitoring system according to the present disclosure.

DESCRIPTION OF EMBODIMENTS

Figure 1:
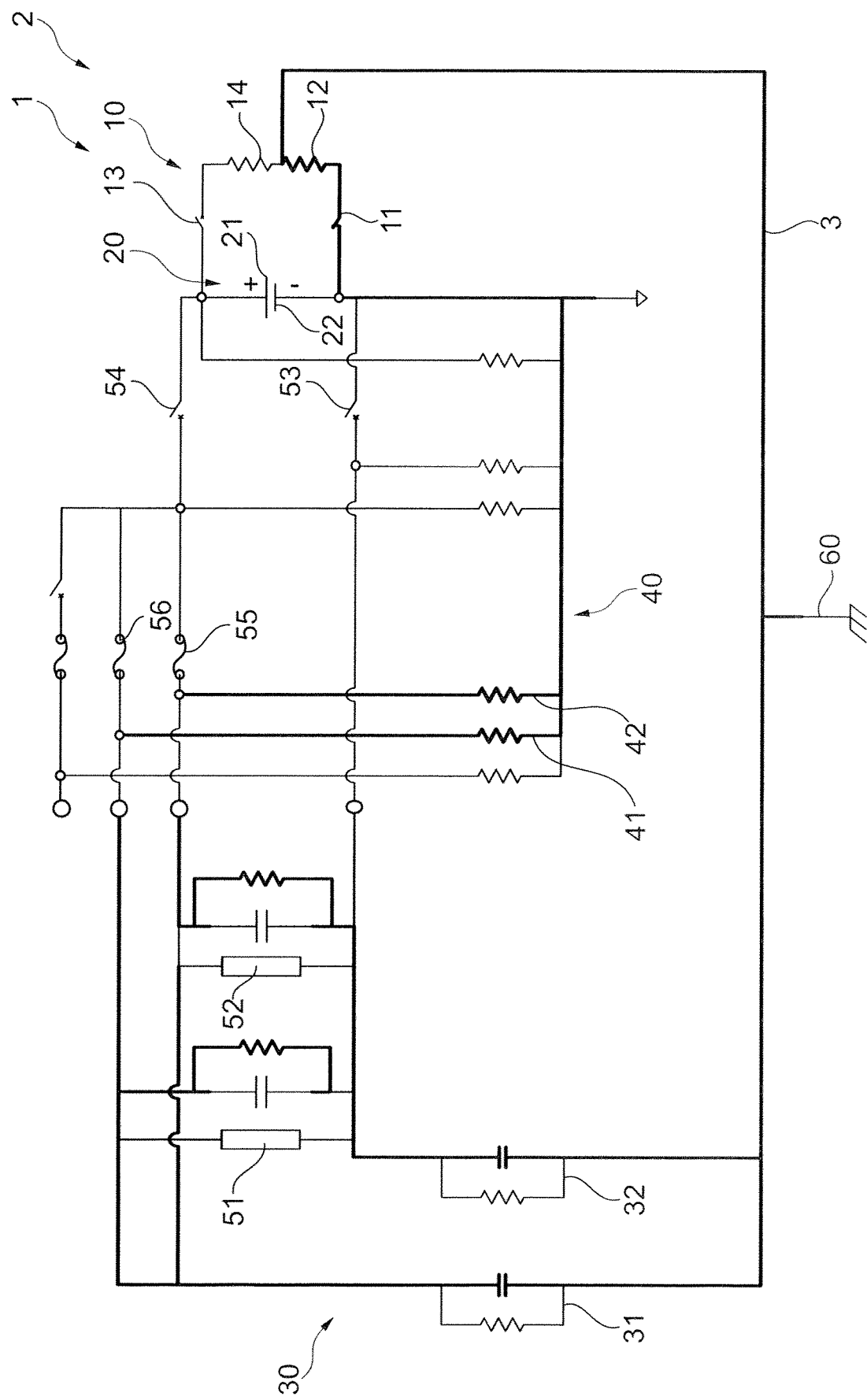
FIG. 1 shows schematically and exemplarily an embodiment of an energy monitoring system according to the present disclosure.

FIG. 1 shows an energy monitoring system 1 for discharging energy in an energy transfer device 2 of a vehicle (not shown). The vehicle may be a battery electric vehicle or a hybrid electric vehicle, which utilizes a high voltage energy storage system providing traction energy for propulsion. Thus, the vehicle includes the energy storage system (not shown) and the energy transfer device 2 to transfer energy from the energy storage system to subsystems 51, 52 of the vehicle such as electric front axle drive system and/or electric rear axle drive system. The energy transfer device 2 may be coupled with the energy storage system on one side and an electric chassis 60 of the vehicle on the other side.

The energy monitoring system 1 includes a voltage terminal unit 20, a first main contactor element 53 and a second main contactor element 54. The voltage terminal unit 20 is connectable to the energy storage system and configured to transfer energy from the energy storage system to subsystems 51, 52 of the vehicle. Specifically, the voltage terminal unit 20 may be a high voltage terminal unit, which may be connected to the high voltage energy storage system arranged in the vehicle. The first main contactor element 53 is connected to a negative terminal element 22 of the voltage terminal unit 20 and the second main contactor element 54 is connected to a positive terminal element 21 of the voltage terminal unit 20. In case the first main contactor element 53 and/or the second main contactor element 54 is opened, energy transfer from the energy storage system to the subsystems 51, 52 can be disconnected.

The energy monitoring system 1 further includes an isolation monitoring unit 10, a diagnostic monitoring unit 40, a capacitor unit 30 and a control unit (not shown).

The isolation monitoring unit 10 includes a first isolation switch element 11, a first isolation resistor element 12, a second isolation switch element 13 and a second isolation resistor element 14. The first isolation resistor element 12 may be connected to the negative terminal element 22 of the voltage terminal unit 20 via the first isolation switch element 11 and the second isolation resistor element 14 may be connected to the positive terminal element 21 of the voltage terminal unit 20 via the second isolation switch element 13. The isolation monitoring unit 10 is configured to measure an isolation resistance of the energy storage system.

The capacitor unit 30 is connected to the voltage terminal unit 20 and configured filter electromagnetic interferences by storing energy during energy transfer from the energy storage system to the subsystem 51, 52. The capacitor unit 20 includes a first Y-capacitor element 31 and a second Y-capacitor element 32. The capacitor unit 20 further includes insulation resistances between the voltage terminal unit 20 and the electrical chassis 60. The first and second Y-capacitor elements 31, 32 are configured to filter out high frequency noise during the energy transfer. However, even though the energy storage system may be electrically disconnected from the voltage terminal unit 20 and/or the energy transfer device 2 ordinarily or accidentally, the capacitor unit 30 may still contain electric energy. To avoid an electric shock due to latent energy stored in the capacitor unit 30, the control unit may switch the isolation monitoring unit 10 and the diagnostic monitoring unit 40 to form a discharge circuit 3.

The diagnostic monitoring unit 40 is configured to receive information about electromechanical connections inside the energy monitoring system 1 and/or the energy transfer device 2, particularly in case of a malfunction or a failure of the components such as defect of welded contactors or blown fuses during the energy transfer. The diagnostic monitoring unit 40 includes at least one, preferably several diagnostic resistor elements 41, 42 arranged between the negative terminal element 22 of the voltage terminal unit 20 and components such as contactors and/or fuses 55, 56.

The control unit may be in communication with at least one electronic control unit of the vehicle. The control unit may be configured to receive information about an energy transfer state from the energy storage system to the subsystems and an energy level of the capacitor unit. For instance, after a disconnection of the energy transfer, the control unit may determine if the energy level of the capacitor unit 30 exceeds a predefined threshold. The predefined threshold may be a safe energy level of the capacitor unit 30. Hence, if the detected energy level of the capacitor unit is higher than the predefined threshold, the control unit may initiate to discharge the capacitor unit 30 to reduce or even remove energy stored in the capacitor unit 30 by means of the discharge circuit 3.

To provide the discharge circuit 3, the control unit opens the second isolation switch element 13 after the first main contactor element 53 and the second main contactor element 54 are opened, i.e. after the energy transfer is disconnected. However, the first isolation switch element 11 remains connected to the negative terminal element 22 of the voltage terminal unit 20. Accordingly, the first isolation resistor element 12 can be connected with the diagnostic resistor elements 41, 42 and the capacitor unit 30. The control unit is configured to arrange the discharge circuit 3 only if the energy transfer is disconnected.

A resistance capacity of the energy monitoring system can be, thus, increased by the diagnostic resistor element(s) 41, 42 and the first isolation resistor element 12. Accordingly, latent energy stored in the capacitor unit may be easily and quickly transferred to the diagnostic resistor element(s) 41, 42 and the first isolation resistor element 12 after the disconnection of the energy transfer. Hence, the energy monitoring system 1 allows quick discharge of the capacitor unit 30 within a few seconds by providing the discharge circuit 3 including the isolation monitoring unit 10 and a diagnostic monitoring unit 40 in case of the disconnection of the energy transfer from the energy storage system. For instance, the capacitor unit 30 may be discharged within 5 seconds after the disconnection of the energy transfer.

FIG. 2 shows a diagram of discharging a capacitor unit by a conventional energy monitoring system. An X axis of the diagram indicates time in seconds and a Y axis of the diagram indicates a voltage level of the capacitor unit. In the conventional energy monitoring system, the capacitor unit may discharged by an active resistor element which may be additionally arranged in the energy monitoring system. As shown in FIG. 2, the conventional energy monitoring system requires approximately 50 seconds to discharge the capacitor unit. In contrast, the energy monitoring system applying the first isolation resistor element 12 and the diagnostic resistor elements 41, 42 for the discharge circuit 3 requires much shorter time, i.e. approximately 5 seconds to discharge the capacitor unit 30 (see FIG. 3).

It has to be noted that embodiments of the disclosure are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the disclosure has been illustrated and described in detail in the drawings and description, such illustration and description are to be considered illustrative or exemplary and not restrictive. The disclosure is not limited to the disclosed embodiments. Other variations to the disclosed embodiments can be understood and effected by those skilled in the art in practicing a claimed disclosure, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An energy monitoring system for discharging energy in an energy transfer device of a vehicle, the energy monitoring system comprising:
   an isolation monitoring unit;
   a capacitor unit;
   a voltage terminal unit; and
   a control unit;

wherein the voltage terminal unit is connectable to an energy storage system and configured to transfer energy from the energy storage system to at least one subsystem of the vehicle;

wherein the isolation monitoring unit comprises a first isolation switch element and a first isolation resistor element, wherein the first isolation resistor element is connectable to the voltage terminal unit via the first isolation switch element;

wherein the capacitor unit is connected to the voltage terminal unit and configured to filter electromagnetic interferences by storing energy during energy transfer from the energy storage system to the subsystem;

wherein the control unit is configured to close the first isolation switch element in case of a disconnection of the energy transfer to form a discharge circuit connecting the isolation monitoring unit and the capacitor unit; and wherein the discharge circuit is configured to discharge energy stored in the capacitor unit.

2. The energy monitoring system according to claim 1, wherein the discharge circuit is switchable only in case of the disconnection of the energy transfer.

3. The energy monitoring system according to claim 1, wherein the isolation monitoring unit comprises a second isolation switch element and a second isolation resistor element, wherein the second isolation resistor element is connectable to the voltage terminal unit via the second isolation switch element, and wherein the control unit is configured to open the second isolation switch element in case of the disconnection of the energy transfer.

4. The energy monitoring system according to claim 3, wherein the voltage terminal unit comprises a positive terminal element and a negative terminal element, wherein the first isolation switch element is arranged between the first isolation resistor element of the isolation monitoring unit and the negative terminal element of the voltage terminal unit, and wherein the second isolation switch element is arranged between the second isolation resistor element of the isolation monitoring unit and the positive terminal element of the voltage terminal unit.

5. The energy monitoring system according to claim 1, further comprising at least one main contactor element, wherein the main contactor element is arrangeable between the voltage terminal unit and the subsystem, and wherein the control unit is configured to open the main contactor element in case of the disconnection of the energy transfer.

6. The energy monitoring system according to claim 1, further comprising a diagnostic monitoring unit with at least one diagnostic resistor element for monitoring at least one electrical connection during the energy transfer, wherein the discharge circuit connects the isolation monitoring unit, the diagnostic monitoring unit and the capacitor unit for discharging energy stored in the capacitor unit.

7. The energy monitoring system according to claim 1, wherein the capacitor unit comprises at least one Y-capacitor element.

8. The energy monitoring system according to claim 1, wherein the voltage terminal unit is a high voltage terminal unit connectable to a high voltage energy storage system.

9. The energy monitoring system according to claim 1, wherein the energy monitoring system is configured to discharge the capacitor unit in less than 5 seconds.

10. An energy transfer device, comprising:
an energy monitoring system for discharging energy in the energy transfer device, the energy monitoring system comprising:
an isolation monitoring unit;
a capacitor unit;
a voltage terminal unit; and
a control unit;
wherein the voltage terminal unit is connectable to an energy storage system and configured to transfer energy from the energy storage system to at least one subsystem of the vehicle;
wherein the isolation monitoring unit comprises a first isolation switch element and a first isolation resistor element, wherein the first isolation resistor element is connectable to the voltage terminal unit via the first isolation switch element;
wherein the capacitor unit is connected to the voltage terminal unit and configured to filter electromagnetic interferences by storing energy during energy transfer from the energy storage system to the subsystem;
wherein the control unit is configured to close the first isolation switch element in case of a disconnection of the energy transfer to form a discharge circuit connecting the isolation monitoring unit and the capacitor unit; and
wherein the discharge circuit is configured to discharge energy stored in the capacitor unit.

11. A vehicle, comprising:
an energy storage system; and
an energy transfer device, wherein the energy transfer device is arranged between the energy storage system and an electrical chassis of the vehicle, wherein the energy transfer device comprises:
an energy monitoring system for discharging energy in the energy transfer device, the energy monitoring system comprising:
an isolation monitoring unit;
a capacitor unit;
a voltage terminal unit; and
a control unit;
wherein the voltage terminal unit is connectable to an energy storage system and configured to transfer energy from the energy storage system to at least one subsystem of the vehicle;
wherein the isolation monitoring unit comprises a first isolation switch element and a first isolation resistor element, wherein the first isolation resistor element is connectable to the voltage terminal unit via the first isolation switch element;
wherein the capacitor unit is connected to the voltage terminal unit and configured to filter electromagnetic interferences by storing energy during energy transfer from the energy storage system to the subsystem;
wherein the control unit is configured to close the first isolation switch element in case of a disconnection of the energy transfer to form a discharge circuit connecting the isolation monitoring unit and the capacitor unit; and
wherein the discharge circuit is configured to discharge energy stored in the capacitor unit.

12. The vehicle according to claim 11, wherein the control unit is configured to form a discharge circuit if energy transfer from the energy storage system to at least one subsystem of the vehicle is disconnected.

13. The vehicle according to claim 11, wherein the vehicle is a battery electric vehicle or a hybrid electric vehicle.

14. An energy monitoring method for an energy transfer device of a vehicle, the energy monitoring method comprising:

connecting a capacitor unit to a voltage terminal unit;

transferring energy from an energy storage system to at least one subsystem of the vehicle;

closing a first isolation switch element of an isolation monitoring unit in case of a disconnection of energy transfer to form a discharge circuit connecting the isolation monitoring unit and the capacitor unit; and discharging energy stored in the capacitor unit;

wherein the capacitor unit is configured to filter electromagnetic interference by storing energy during energy transfer from the energy storage system to the subsystem;

wherein the voltage terminal unit is connectable to an energy storage system; and wherein a first isolation resistor element of the isolation monitoring unit is connectable to the voltage terminal unit via the first isolation switch element.

15. A non-transitory computer-readable medium comprising instructions stored in a memory and executed by a processor to carry out energy monitoring method steps for an energy transfer device of a vehicle, the energy monitoring method steps comprising:

connecting a capacitor unit to a voltage terminal unit;

transferring energy from an energy storage system to at least one subsystem of the vehicle;

closing a first isolation switch element of an isolation monitoring unit in case of a disconnection of energy transfer to form a discharge circuit connecting the isolation monitoring unit and the capacitor unit; and discharging energy stored in the capacitor unit;

wherein the capacitor unit is configured to filter electromagnetic interference by storing energy during energy transfer from the energy storage system to the subsystem;

wherein the voltage terminal unit is connectable to an energy storage system; and wherein a first isolation resistor element of the isolation monitoring unit is connectable to the voltage terminal unit via the first isolation switch element.

* * * * *